Nov. 13, 1945.  L. I. LOUVIAUX  2,388,789
GLASS INSPECTION APPARATUS
Filed Aug. 3, 1940
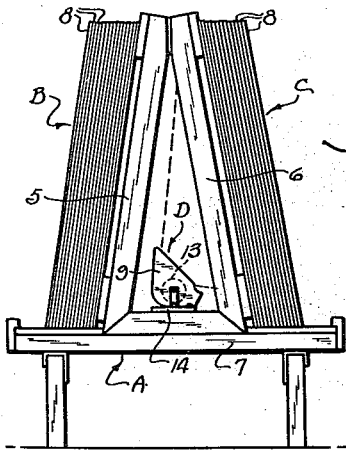
Fig. 1.
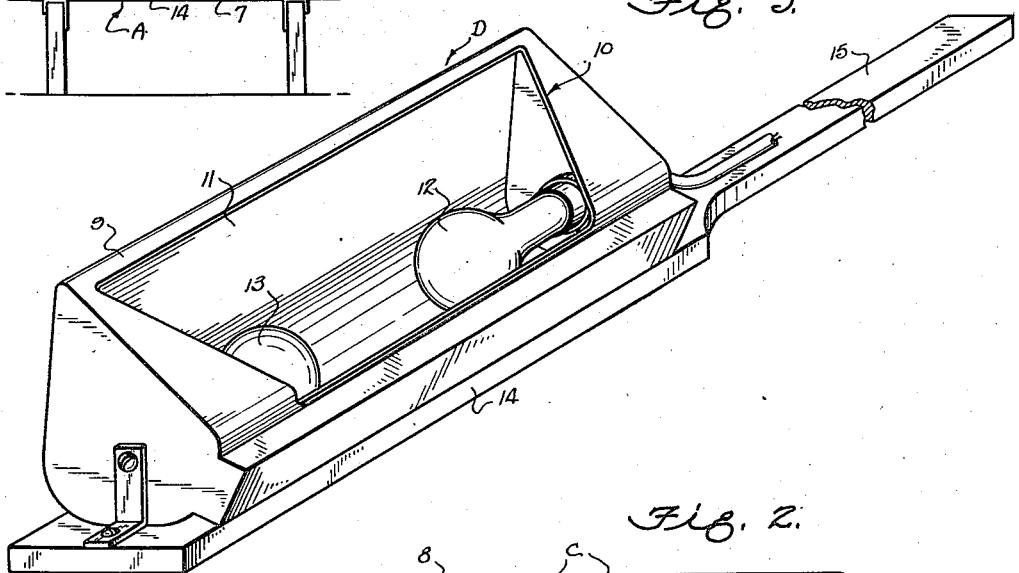
Fig. 3.
Fig. 2.
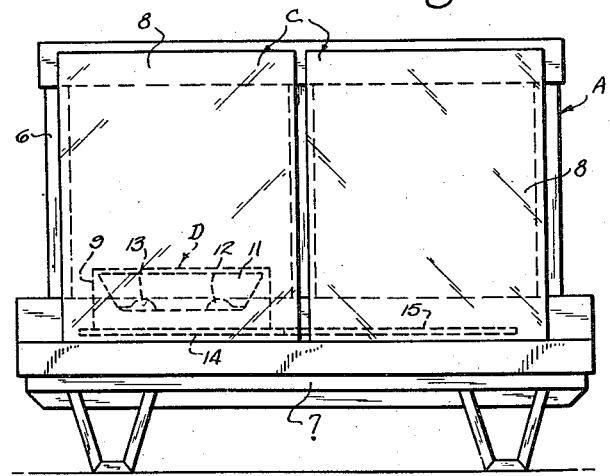
Inventor
LEON I. LOUVIAUX.
By Frank Fraser
Attorney Patented Nov. 13, 1945

2,388,789

UNITED STATES PATENT OFFICE 2,388,789

GLASS INSPECTION APPARATUS

Leon I. Louviaux, Toledo, Ohio, assignor to Libbey-Owens-Ford Glass Company, Toledo, Ohio, a corporation of Ohio Application August 3, 1940, Serial No. 350,739

2 Claims. (Cl. 88—14)

The present invention relates to the art of glass inspection generally, and more particularly to an improved apparatus for the inspection of glass sheets or plates.

Although the invention is not restricted to any particular use, it is of especial utility in determining the presence of ream or similar defects in sheets or plates of transparent glass. Ream may be defined as small smears or gobs of unhomogeneous glass scattered throughout the sheets or plates and having a different index of refraction than the main body of glass.

In the manufacture of plate glass, it is customary, after the glass sheets or plates have been ground and polished, to pass them through a suitable washing machine, after which they are inspected, marked and cut to predetermined sizes. The cut sheets or plates are then ordinarily stacked in a substantially vertical position upon suitable racks commonly referred to as glass bucks. Occasionally, an inspector may overlook one or more small areas of ream in the glass sheet or plate during inspection thereof, with the result that the defective sheet or plate will be passed by the inspector and placed upon the buck.

The aim of this invention is to provide a simple yet efficient apparatus whereby a plurality of glass sheets or plates may be simultaneously inspected for ream or similar defects while supported upon the buck in a rapid, accurate and convenient manner to determine if any defective sheet or plate has been inadvertently placed thereon. This is accomplished by providing an artificial source of illumination at one side of the stack of glass sheets or plates for directing light therethrough whereby they may be simultaneously inspected from the opposite side thereof. Thus, if any ream or other defects optically different from the main body of glass are present in the sheets or plates, they will be readily discernible by the operator viewing the stack of sheets or plates from the side thereof opposite to the light source.

Other objects and advantages of the invention will become more apparent during the course of the following description, when taken in connection with the accompanying drawing.

In the drawing, wherein like numerals are employed to designate like parts throughout the same:

Fig. 1 is an end view of a glass buck supporting two stacks of glass sheets or plates in substantially vertical position;

Fig. 2 is a side view thereof; and

Fig. 3 is a perspective view of the lighting device used in the inspection of the glass sheets or plates while supported upon the buck.

With reference now to the drawing, there is illustrated in Fig. 1 a glass buck A supporting the two stacks of glass sheets or plates B and C in a substantially vertical position, while D designates the portable lighting device employed in the inspection of the glass sheets or plates while mounted upon said buck. The buck A may be of any conventional type including a pair of upwardly converging frames 5 and 6 secured upon a horizontal base 7. Each stack of glass sheets or plates B and C comprises a plurality of sheets or plates supported on edge upon the horizontal base 7 and resting in an inclined position one upon the other and against the respective supporting frame 5 or 6.

The portable lighting device D comprises a horizontally elongated housing 9 having the top thereof provided with a longitudinally extending opening 10. Mounted within the housing is a suitable reflector 11 and secured within the opposite ends of said housing are suitable sockets for receiving the light sources 12 and 13 comprising ordinary incandescent lamps. The reflector 11 is adapted to direct the light from the incandescent lamps 12 and 13 through the opening 10 and upon the glass sheets or plates 8. The housing 9 is carried by a support 14 having one end thereof suitably shaped to provide a handle 15.

In practice, after the glass sheets or plates 8 have been inspected, marked and cut, they are stacked as at B and C upon the buck A. When it is then desired to inspect the glass sheets or plates, the operator simply positions the lighting device D between the two inclined supporting frames 5 and 6, at which time it may be supported upon the horizontal base 7. The incandescent lamps 12 and 13 are illuminated and the reflector 11 serves to direct the light therefrom through one of the stacks of glass sheets or plates, such as stack C in Fig. 1. The light from the incandescent lamps is adapted to illuminate the glass sheets or plates over their entire areas, thereby rendering possible a rapid and accurate inspection of the sheets or plates simultaneously from the opposite side thereof.

As explained above, ream has a different refractive index than the main body of glass, and because it is optically different any ream which may be present in the sheets or plates will be readily visible to the operator viewing the stack of sheets or plates from the front thereof. If any ream is detected, the operator can move the sheets or plates 8 one at a time or in any other suitable way until the sheet or plate containing the ream is located, whereupon it can be removed from the buck. After inspecting one stack of sheets, the lighting device D is removed and reversed so that the opposite stack of sheets B can be inspected. In this way, it will be readily seen that a plurality or group of glass sheets or plates stacked or laid one against or upon the other can be simultaneously inspected for ream or other similar defects in a simple, convenient manner.

It will of course be appreciated that the invention is not restricted to placing the sheets in an inclined position upon a buck as shown in Fig. 1 or to the construction of the buck. Likewise, the method above described can be employed in the inspection of window glass as well as plate glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the simultaneous inspection of a multiplicity of glass sheets or plates for defects such as ream, the combination with means for supporting a multiplicity of sheets or plates of glass face to face in a substantially vertical position and in contact with one another, of a hand portable lighting device removably carried by said supporting means at one side of the said sheets or plates for directing light therethrough whereby they may be simultaneously inspected from the opposite side.

2. In apparatus for the simultaneous inspection of a multiplicity of glass sheets or plates for defects such as ream, the combination with means for supporting a multiplicity of sheets or plates of glass face to face in a substantially vertical position and in contact with one another, of a hand portable lighting device removably carried by said supporting means at one side of the said sheets or plates for directing light therethrough whereby they may be simultaneously inspected from the opposite side; said lighting device comprising an elongated housing having a longitudinally extending opening in the top thereof, a reflector arranged within said housing, a light source also mounted in said housing, said reflector being adapted to direct the light from said light source through said opening and upon the glass sheets or plates, and means carrying said housing having a hand gripping portion adapted to be grasped by an operator to facilitate the manual positioning and removal of the said lighting device.

LEON I. LOUVIAUX.